(12) United States Patent
Agresti et al.

(10) Patent No.: US 12,061,265 B2
(45) Date of Patent: Aug. 13, 2024

(54) TIME-OF-FLIGHT SIMULATION DATA TRAINING CIRCUITRY, TIME-OF-FLIGHT SIMULATION DATA TRAINING METHOD, TIME-OF-FLIGHT SIMULATION DATA OUTPUT METHOD, TIME-OF-FLIGHT SIMULATION DATA OUTPUT CIRCUITRY

(71) Applicant: Sony Semiconductor Solutions Corporation, Kanagawa (JP)

(72) Inventors: Gianluca Agresti, Stuttgart (DE); Henrik Schäfer, Stuttgart (DE); Yalcin Incesu, Stuttgart (DE); Piergiorgio Sartor, Stuttgart (DE); Pietro Zanuttigh, Padua (IT)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 255 days.

(21) Appl. No.: 17/527,191

(22) Filed: Nov. 16, 2021

(65) Prior Publication Data

US 2022/0163673 A1     May 26, 2022

(30) Foreign Application Priority Data

Nov. 23, 2020   (EP) ................................... 20425051

(51) Int. Cl.
*G06N 3/08*     (2023.01)
*G01S 7/48*     (2006.01)
(Continued)

(52) U.S. Cl.
CPC .......... *G01S 17/894* (2020.01); *G01S 7/4808* (2013.01); *G06N 3/08* (2013.01); *G06T 7/521* (2017.01);
(Continued)

(58) Field of Classification Search
CPC ..... G01S 17/894; G01S 7/4808; G06T 7/521; G06T 2207/10028; G06T 2207/20081; G06N 3/08
See application file for complete search history.

(56) References Cited

U.S. PATENT DOCUMENTS 9,805,294 B2 * 10/2017 Liu ........................... G06T 7/60
10,311,378 B2 * 6/2019 Nowozin ............... G06N 20/20
(Continued)

OTHER PUBLICATIONS

Agresti et al., "Deep Learning for Confidence Information in Stereo and ToF Data Fusion", Computer Vision Foundation, pp. 697-705.
Marco et al., "DeepToF: Off-the-Shelf Real-Time Correction of Multipath Interference in Time-of-Flight Imaging", ACM Transactions on Graphics, vol. 36, No. 6, Article 219, Nov. 2017, 12 pages.
Hoffman et al., "CyCADA: Cycle-Consistent Adversarial Domain Adaptation", Proceedings of the 35th International Conference on Machine Learning (PMLR), 2018, vol. 80, 10 pages.
(Continued)

*Primary Examiner* — Gregory M Desire
(74) *Attorney, Agent, or Firm* — XSENSUS LLP

(57) ABSTRACT

The present disclosure generally pertains to time-of-flight simulation data training circuitry, configured to:
obtain time-of-flight camera model data based on a time-of-flight camera model modelling a real time-of-flight camera of a real time-of-flight camera type;
obtain real time-of-flight data from at least one real time-of-flight camera of the real time-of-flight camera type;
determine a difference between the real time-of-flight data and the time-of-flight camera model data; and
update, based on the determined difference, the time-of-flight camera model for generating simulated time-of-flight data representing the real time-of-flight camera.

27 Claims, 6 Drawing Sheets

(51) Int. Cl.
  *G01S 17/894* (2020.01)
  *G06T 7/521* (2017.01)
(52) U.S. Cl.
  CPC .............. *G06T 2207/10028* (2013.01); *G06T 2207/20081* (2013.01)

(56) References Cited

U.S. PATENT DOCUMENTS

| | | | | |
|---|---|---|---|---|
| 10,861,165 | B2 * | 12/2020 | Wood | G06V 10/147 |
| 11,157,768 | B1 * | 10/2021 | Levinson | G06N 3/088 |
| 11,563,911 | B2 * | 1/2023 | Li | H04N 25/705 |
| 11,718,317 | B2 * | 8/2023 | Schubert | H04L 9/3268 701/26 |
| 11,810,329 | B2 * | 11/2023 | Yu | G06T 7/90 |
| 2018/0129973 | A1 | 5/2018 | Nowozin et al. | |
| 2018/0225823 | A1 | 8/2018 | Zhou et al. | |

OTHER PUBLICATIONS

Agresti et al., "Deep Learning for Multi-Path Error Removal in ToF Sensors", Computer Vision Foundation, 2018, 16 pages.

Zhu et al., "Unpaired Image-to-Image Translation using Cycle-Consistent Adversarial Networks", Computer Vision Foundation, 2017, pp. 2223-2232.

Freedman et al., "SRA: Fast Removal of General Multipath for ToF Sensors", ECCV 2014, Part I, LNCS 8689, pp. 234-249.

Agresti et al., "Unsupervised Domain Adaptation for ToF Data Denoising with Adversarial Learning", IEEE/CVF Conference on Computer Vision and Pattern Recognition (CVPR), 2019, pp. 5579-5586.

Chang et al., "Learning Camera-Aware Noise Models", arXiv:2008.09370v1 [cs.CV], Aug. 21, 2020, pp. 1-25.

* cited by examiner

TIME-OF-FLIGHT SIMULATION DATA TRAINING CIRCUITRY, TIME-OF-FLIGHT SIMULATION DATA TRAINING METHOD, TIME-OF-FLIGHT SIMULATION DATA OUTPUT METHOD, TIME-OF-FLIGHT SIMULATION DATA OUTPUT CIRCUITRY

CROSS-REFERENCE TO RELATED APPLICATION

The present application claims priority to European application number 20425051.8 filed in the European Patent Office on Nov. 23, 2020, the entire contents of which is incorporated herein by reference.

TECHNICAL FIELD

The present disclosure generally pertains to time-of-flight simulation data training circuitry, a time-of-flight simulation data training method, a time-of-flight simulation data output method, and time-of-flight simulation data circuitry.

TECHNICAL BACKGROUND

Known model-based time-of-flight (ToF) simulators typically aim at reproducing relevant phenomena and error sources of real ToF measurements. Such known model-based ToF simulators may use a (mathematical) model and a renderer to simulate the behavior of a time-of-flight camera in a given scene. In order to do so, model-based simulators typically use a simulated/synthetic scene and a camera model (which models a hardware of a ToF camera) as input.

Although there exist techniques for simulating a time-of-flight measurement, it is generally desirable to provide time-of-flight simulation data training circuitry, a time-of-flight simulation data training method, time-of-flight simulation data output circuitry, and a time-of-flight simulation data output method.

SUMMARY

According to a first aspect the disclosure provides time-of-flight simulation data training circuitry, configured to:
obtain time-of-flight camera model data based on a time-of-flight camera model modelling a real time-of-flight camera of a real time-of-flight camera type;
obtain real time-of-flight data from at least one real time-of-flight camera of the real time-of-flight camera type;
determine a difference between the real time-of-flight data and the time-of-flight camera model data; and
update, based on the determined difference, the time-of-flight camera model for generating simulated time-of-flight data representing the real time-of-flight camera.

According to a second aspect the disclosure provides a time-of-flight simulation data training method, comprising:
obtaining time-of-flight camera model data based on a time-of-flight camera model modelling a real time-of-flight camera of a real time-of-flight camera type;
obtaining real time-of-flight data of at least one real time-of-flight camera of the real time-of-flight camera type;
determining a difference between the real time-of-flight data and the time-of-flight camera model data; and
updating, based on the determined difference, the time-of-flight camera model for generating simulated time-of-flight data representing the real time-of-flight camera.

According to a third aspect the disclosure provides a time-of-flight simulation data output method, comprising:
inputting modelled time-of-flight camera data into a time-of-flight simulation neural network configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type.

According to a fourth aspect the disclosure provides time-of-flight simulation data circuitry configured to:
provide a time-of-flight simulation neural network, configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
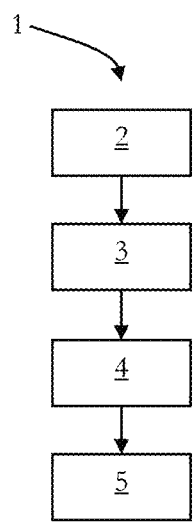
FIG. 1 depicts a time-of-flight simulation data training method according to the present disclosure in a block diagram.

Before a detailed description of the embodiments under reference of FIG. 1 is given, general explanations are made.

As mentioned in the outset, in order to simulate a time-of-flight measurement, possible error or noise sources of a real time-of-flight camera may need to be known. However, it may be challenging to reproduce each error source, since they may be either hard to model or not determinable at all.

For example, complete information about hardware components of the real time-of-flight camera may have to be known, e.g. about a lens, a pixel structure and pixel properties, and their impact in an image acquisition needs to be properly modelled.

For example, multipath interference and/or subsurface scattering may be considered as challenging for modelling purposes since their simulation may require an accurate measurement of reflections of each surface element in a scene.

It has been recognized that it is possible to improve a quality of a model-based ToF simulator with a data driven approach.

However, it has been recognized that known data driven approaches may require extensive, and therefore costly, ground-truth data, such as real time-of-flight measurements, wherein it is desirable to reduce costs and therefore avoid the usage of real time-of-flight data as ground truth.

Moreover, it has been recognized that it is possible to use a non-explicit ToF camera model, e.g. a learned ToF camera model, which emulates statistics of real ToF data in order to simulate a ToF measurement.

Therefore, some embodiments pertain to time-of-flight simulation data training circuitry, configured to: obtain time-of-flight camera model data based on a time-of-flight camera model modelling a real time-of-flight camera of a real time-of-flight camera type; obtain real time-of-flight data from at least one real time-of-flight camera of the real time-of-flight camera type; determine a difference between the real time-of-flight data and the time-of-flight camera model data; and update, based on the determined difference, the time-of-flight camera model for generating simulated time-of-flight data representing the real time-of-flight camera.

The time-of-flight simulation data training circuitry may include a processor, such as a CPU (central processing unit), GPU (graphic processing unit), FPGA (field programmable gate array), or the like, a computer, a server, and/or the like being capable of performing a simulation, such that time-of-flight simulation data may be obtained.

Furthermore, the time-of-flight simulation data training circuitry, according to some embodiments, may be configured to perform a training in order to provide the time-of-flight simulation data. In some embodiments, the time-of-flight simulation data training circuitry may be configured to conduct a training for a different circuitry, such that the time-of-flight simulation data training circuitry may only supervise the training e.g. for a neural network.

Moreover, the time-of-flight simulation data training circuitry may have data of a model-based simulator as an input and is configured to refine the data of the model-based simulator by utilizing a ToF simulation data training method based on the data of the model-based simulator. Hence, any (known) model based simulator can be used according to the present disclosure.

The training may be carried out on/for at least one neural network, such as a convolutional neural network, discriminative neural network, and/or the like.

In some embodiments, multiple neural networks, each having a particular task, may be utilized in order to carry out the methods described herein. In some embodiments, one neural network may be utilized which unifies characteristics of different types of neural networks (e.g. apply different learning algorithms, implement different models, and the like). Moreover, the different (or one) neural network(s) may be implemented on the time-of-flight simulation data training circuitry or on other circuitry (e.g. when the time-of-flight simulation data training circuitry supervises the training).

The time-of-flight simulation data training circuitry is, in some embodiments, configured to obtain time-of-flight camera model data.

The time-of-flight camera model data may be derived from a time-of-flight camera model, e.g. an algorithm or a program which may include instructions for providing the time-of-flight camera model data. The time-of-flight camera model may be a digital approximation (or twin) of a real time-of-flight camera, i.e. in an ideal case the time-of-flight camera model and the real time-of-flight camera may produce exactly the same (ToF output) data, given that a digital scene (e.g. object) for the time-of-flight camera model corresponds to a real scene.

Generally, any ToF (input or output) data discussed herein, be it the real ToF data, the simulated ToF data, the modelled ToF data, transformed real ToF data, the ToF camera model data, or the like, may be present as raw ToF data (e.g. ToF phases (e.g. I/Q components)), processed ToF data (e.g. estimated depth, amplitude and/or intensity maps acquired at single or multiple modulation frequencies)), or the like.

Furthermore, the present disclosure is not limited to any type of ToF, such as indirect ToF, direct ToF, spot ToF, or the like.

Not only the digital scene may not exactly represent the real scene, which may lead to simulation errors, also the time-of-flight camera model may not exactly represent the real time-of-flight camera, such that statistical errors, which may occur in the real time-of-flight camera (e.g. due to manufacturing errors, or the like) may not be taken into account by the time-of-flight camera model.

A statistical error may result from the fact that the manufacturing process may have physical boundaries, e.g. that it is not possible to produce an ideal lens, an ideal camera chip, or the like. Furthermore, thermal fluctuations may lead to different performances of real time-of-flight cameras.

Since a statistical error is taken into account, it may be assumed that all or many real time-of-flight camera of the same real time-of-flight camera type (e.g. direct time-of-flight, indirect time-of-flight, spotted time-of-flight, or the like) may produce the same or a similar error, such that it is possible to apply the time-of-flight camera model to another real time-of-flight camera of the real time-of-flight camera type.

In some embodiments, the time-of-flight simulation data training circuitry is further configured to obtain real time-of-flight data from at least one real time-of-flight camera of the real time-of-flight camera type.

The real time-of-flight data may be a complete dataset of different (i.e. at least two) real time-of-flight cameras, a statistically analyzed dataset (e.g. mean values) of the different time-of-flight cameras or real time-of-flight data from a single real time-of-flight camera (e.g. the real time-of-flight camera which is supposed to be modelled by the time-of-flight camera model).

In some embodiments, the time-of-flight simulation data training circuitry may further be configured to determine a difference between the real time-of-flight data and the time-of-flight camera model data. For example, the difference may be determined by a discriminative neural network, wherein the discriminative neural network may be a part of the time-of-flight simulation data training circuitry. However, in some embodiments, the discriminative neural network may be provided on different circuitry.

The difference may be a qualitative difference (e.g. the time-of-flight camera model data may or may not correspond to the real time-of-flight data) or a quantitative difference, e.g. a (statistical or absolute) deviation (of values) between the time-of-flight camera model data and the real time-of-flight data or a mixture of both.

This difference may be utilized in order to update the time-of-flight camera model.

For example, for a given condition (e.g. temperature, light intensity of ambient light, air humidity, or the like), a measurement error may be added to the time-of-flight camera model. Since a neural network may be trained according to the claimed subject-matter, also an abstract condition defined in and by the neural network may be updated, as generally known.

In some embodiments, the time-of-flight camera model data is obtained from a time-of-flight camera model neural network, which is, for example, a convolutional neural network.

The time-of-flight camera model neural network may be trained to provide time-of-flight camera model data, i.e. trained to apply the time-of-flight camera model. In other words, the time-of-flight camera model neural network may be configured to generate and/or execute an algorithm which applies the time-of-flight camera model, such that the time-of-flight camera model data may be obtained.

In some embodiments, the time-of-flight camera model neural network is a convolutional neural network, as discussed herein.

In some embodiments, the difference between the real time-of-flight data and the time-of-flight camera model data is determined in a discriminative neural network.

In order for the discriminative neural network to determine the difference, the time-of-flight camera model neural network may provide the time-of-flight camera model data in a same domain as the real time-of-flight data. In some embodiments, the time-of-flight camera model data is domain-transformed by the time-of-flight camera model neural network.

The discriminative neural network may be trained to determine the difference, wherein the training of the discriminative neural network is not limited to any training method.

In some embodiments, the time-of-flight simulation data training circuitry is further configured to obtain modelled time-of-flight camera data.

The modelled time-of-flight camera data may correspond to purely synthetic data in a synthetic domain. That means that the discriminative neural network may typically not be able to take these data into account for determining the difference. Hence, the modelled time-of-flight camera data may model the real time-of-flight camera without any statistical error, hence the modelled time-of-flight camera data may represent an ideal time-of-flight camera.

In some embodiments, the modelled time-of-flight data is obtained/provided by model-based simulation circuitry, i.e. a time-of-flight model-based simulator, using a given mathematical model, and the modelled ToF data are then used as an input to the ToF simulation data training circuitry. For example, the modelled time-of-flight data is refined by the time-of-flight simulation data training circuitry using a time-of-flight simulation data training method according to the present disclosure.

The modelled time-of-flight data may be transformed into the time-of-flight camera model data, i.e. the statistical error may be (symbolically speaking) added to the modelled time-of-flight data by the time-of-flight camera model neural network, such that also a domain-transform may be carried out for determining the difference between the real time-of-flight data and the time-of-flight camera model data.

Hence, in some embodiments the time-of-flight simulation data training circuitry is further configured to: transform the modelled time-of-flight camera data into the time-of-flight camera model data.

In some embodiments, the transforming is carried out with a time-of-flight camera model neural network, as discussed herein.

In some embodiments, the modelled time-of-flight camera data is obtained from time-of-flight model-based simulation circuitry, as discussed herein.

In some embodiments, the real time-of-flight data is obtained from a plurality of time-of-flight cameras of the real time-of-flight camera type for determining a statistical difference of the real time-of-flight camera type and the time-of-flight camera model, as discussed herein.

For example, the real time-of-flight camera may each distribute real time-of-flight data to a cloud, a server, or the like.

Some embodiments pertain to a time-of-flight simulation data training method, including: obtaining time-of-flight camera model data based on a time-of-flight camera model modelling a real time-of-flight camera of a real time-of-flight camera type; obtaining real time-of-flight data of at least one real time-of-flight camera of the real time-of-flight camera type; determining a difference between the real time-of-flight data and the time-of-flight camera model data; and updating, based on the determined difference, the time-of-flight camera model for generating simulated time-of-flight data representing the real time-of-flight camera, as discussed herein.

The time-of-flight simulation data training method may be carried out with time-of-flight simulation data training circuitry according to the present disclosure, for example.

In some embodiments, the time-of-flight camera model data is obtained from a time-of-flight camera model neural network, as discussed herein. In some embodiments, the time-of-flight camera model neural network is a convolutional neural network. In some embodiments, the difference between the real time-of-flight data and the time-of-flight camera model data is determined in a discriminative neural network. In some embodiments, the time-of-flight simulation data training method further includes: obtaining modelled time-of-flight camera data, as discussed herein. In some embodiments, the time-of-flight simulation data training method, further includes: transforming the modelled time-of-flight camera data into the time-of-flight camera model data, as discussed herein. In some embodiments, the transforming is carried out with a time-of-flight camera model neural network, as discussed herein. In some embodiments, the modelled time-of-flight camera data is obtained from time-of-flight model-based simulation circuitry, as discussed herein. In some embodiments, the real time-of-flight data is obtained from a plurality of time-of-flight cameras of the real time-of-flight camera type for determining a statistical difference of the real time-of-flight camera type and the time-of-flight camera model, as discussed herein.

Some embodiments pertain to a time-of-flight simulation data output method, including: inputting modelled time-of-flight camera data into a time-of-flight simulation neural network configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type.

The time-of-flight simulation neural network may be trained based on a time-of-flight simulation data training method, as discussed above. The time-of-flight simulation neural network may utilize an algorithm, which is developed in a different neural network (e.g. in a ToF simulation data training circuitry according to the present disclosure), or may be compartmented to include e.g. the time-of-flight camera model neural network, the discriminative neural network, and the like.

Hence, the time-of-flight simulation neural network may be configured to directly provide the simulated time-of-flight data, which may be considered as a result of a finished training process, i.e. resulting from a time-of-flight camera model which already takes into account all the trained statistical errors, and the like.

In some embodiments, the modelled time-of-flight data corresponds to a ground truth of a supervised training for training the trained difference between the time-of-flight camera model data and the real time-of-flight data, without limiting the present disclosure in that regard.

For example, the modelled time-of-flight data may be input to a denoiser network in order to train the denoiser network. The denoiser network may be, based on the training, able to link the ground truth to the time-of-flight camera model data.

In some embodiments, the time-of-flight simulation neural network is a convolutional neural network.

In some embodiments, the time-of-flight simulation data output method further includes: obtaining the modelled time-of-flight camera data from time-of-flight model-based simulation circuitry.

That means, in some embodiments, in the time-of-flight simulation data output method modelled time-of-flight data may be obtained and the statistical errors may be added in order to obtain the simulated time-of-flight data.

Hence, in some embodiments, accordingly, the time-of-flight simulation data output method further includes: transforming the modelled time-of-flight camera data into the simulated time-of-flight data; and outputting the simulated time-of-flight data.

In order to carry out the time-of-flight simulation data output method, some embodiments pertain to time-of-flight simulation data circuitry configured to: provide a time-of-flight simulation neural network, configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type, as discussed herein.

The time-of-flight simulation data output circuitry may include a CPU, a GPU, an FPGA, a computer, a time-of-flight camera, or the like, such that the methods described herein can be implemented.

In some embodiments, the modelled time-of-flight data corresponds to a ground truth of a supervised training for training the trained difference between the time-of-flight camera model data and the real time-of-flight data, as discussed herein. In some embodiments, the time-of-flight camera model neural network is a convolutional neural network, as discussed herein. In some embodiments, the time-of-flight simulation data circuitry is further configured to: obtain the modelled time-of-flight camera data from time-of-flight model-based simulation circuitry, as discussed herein. In some embodiments, the time-of-flight simulation data circuitry is further configured to: transform the modelled time-of-flight camera data into the simulated time-of-flight data; and output the simulated time-of-flight data, as discussed herein.

The methods as described herein are also implemented in some embodiments as a computer program causing a computer and/or a processor to perform the method, when being carried out on the computer and/or processor. In some embodiments, also a non-transitory computer-readable recording medium is provided which stores therein a computer program product, which, when executed by a processor, such as the processor described above, causes the methods described herein to be performed.

Returning to FIG. 1, there is depicted a time-of-flight simulation data training method 1 according to the present disclosure in a block diagram, which is carried out by time-of-flight simulation data training circuitry according to the present disclosure.

At 2, time-of-flight camera model data is obtained based on an application of a ToF camera model, which is based on a transformation of modelled time-of-flight data from model-based simulation circuitry (as discussed herein) which is configured to apply a (mathematical) time-of-flight camera model and to use a renderer to simulate a light propagation in a given scene.

At 3, real time-of-flight data is obtained from a real time-of-flight camera, as discussed herein. The real time-of-flight camera utilizes a CAPD (current assisted photonic demodulator) to generate the real time-of-flight data, hence the real time-of-flight camera type of the real time-of-flight camera is indirect time-of-flight.

At 4, a difference between the real time-of-flight data and the time-of-flight camera model data is determined in a discriminative neural network, which is trained together with a ToF camera model neural network, for determining such a difference.

However, the present disclosure is not limited to determining the difference between the real ToF data and the ToF camera model data since additionally or alternatively, the difference between the ToF camera model data and the modelled ToF data may be determined and/or the difference between the modelled ToF data and the real data may be determined.

At 5, the time-of-flight camera model is updated based on the determined difference, as discussed herein.

Figure 2:
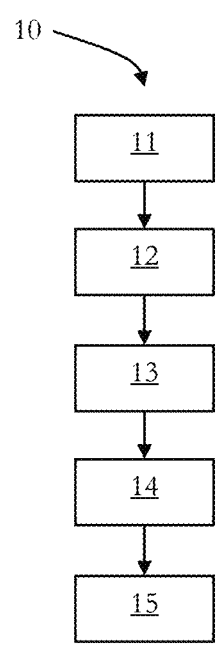
FIG. 2 depicts a further embodiment of a time-of-flight simulation data training method according to the present disclosure in a block diagram.

In FIG. 2, there is depicted a time-of-flight simulation data training method 10 according to the present disclosure in a block diagram, which is carried out by time-of-flight simulation data training circuitry according to the present disclosure.

At 11, modelled time-of-flight camera data is obtained from time-of-flight model-based simulation circuitry.

At 12, the modelled time-of-flight camera data is transformed into the time-of-flight camera model data with a time-of-flight camera model neural network, as discussed herein, thereby obtaining the time-of-flight camera model data.

At 13, real time-of-flight data is obtained from a real time-of-flight camera, as discussed herein. The real time-of-flight camera utilizes a CAPD (current assisted photonic demodulator) to generate the real time-of-flight data, hence the real time-of-flight camera type of the real time-of-flight camera is indirect time-of-flight.

At 14, a difference between the real time-of-flight data and the time-of-flight camera model data is determined in a discriminative neural network, which is trained together with a ToF camera model neural network, for determining such a difference.

At 15, the time-of-flight camera model is updated based on the determined difference, as discussed herein.

Figure 3:
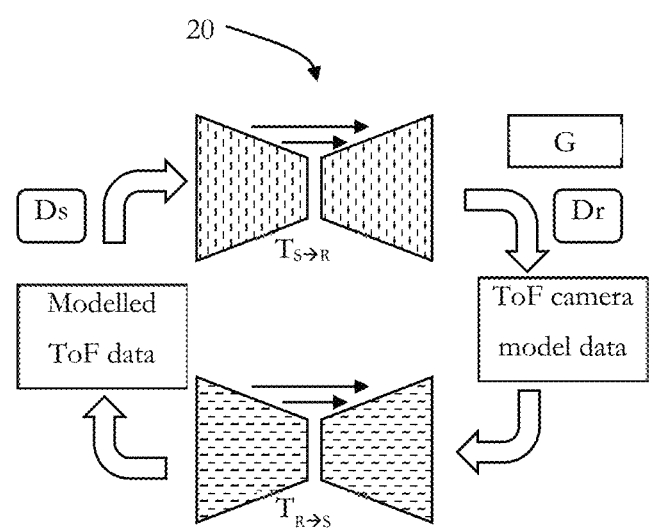
FIG. 3 shows a schematic diagram of time-of-flight simulation data training circuitry according to the present disclosure.

FIG. 3 shows a schematic diagram of time-of-flight simulation data training circuitry 20 according to the present disclosure.

The time-of-flight simulation data training circuitry 20 has two (deep) convolutional neural networks $T_{S \rightarrow R}$ (time-of-flight camera model neural network) and $T_{R \rightarrow S}$ (time-of-flight modelling neural network) implemented, wherein R symbolizes a "real" domain and s symbolizes a "synthetic" domain. That means the network $T_{S \rightarrow R}$ is configured to transform modelled ToF data (which are purely simulated by time-of-flight simulation data circuitry, e.g. model-based simulation circuitry) from the synthetic domain into the real domain. Accordingly, the network $T_{S \rightarrow R}$ is configured to add (statistical) errors to the modelled ToF data, such that ToF camera model data is obtained which model a real ToF camera. In other words, the network $T_{S \rightarrow R}$ takes as input the output of the network $T_{R \rightarrow S}$ and outputs a more realistic version of the input data (i.e. following a statistical signal distribution which is more similar to real ToF data).

The network $T_{S \rightarrow R}$ is trained to produce data which follow the statistical distribution of signals learned from a set of real world data (i.e. real ToF data). In order to learn these statistics, no real depth data is necessary as ground truth (or any other supervisory learning scheme), however, in some embodiments, ground truth data is still envisaged (e.g. in taking raw data and not depth data).

In other words, the network $T_{S \rightarrow R}$ is a (deep) neural network which is configured to refine the modelled ToF data to make them more similar to real ToF data by approximating or reproducing sensor behavior not modelled by known sensor (noise) parameters.

The network $T_{S \rightarrow R}$ is trained to provide ToF camera model data which resemble a statistical distribution of real ToF data (or with respect to what a discriminative network $D_r$ recognizes as real ToF data, as will be discussed below). Furthermore, the ToF camera model data originate from a ground truth depth of simulated scenes, which are given as ground truth to a pretrained denoiser G. In some embodiments, the ToF camera model data are generated by a ToF camera model neural network, whereas in some embodiments, the ToF camera model data are generated in ToF camera model-based simulation circuitry.

The pretrained denoiser G is trained to link the ToF camera model data to the ground truth depth of simulated scenes. The pretrained denoiser is trained in a supervised way on the modelled ToF data.

The ToF camera model data is compared with real time-of-flight data in the discriminative neural network $D_r$, which is configured to determine a difference between ToF camera model data and real time-of-flight data. In other words, the discriminative neural network $D_r$ is trained to understand whether the ToF camera model data follows a similar (or the same) distribution as the real ToF data.

The convolutional neural network $T_{R \rightarrow S}$, accordingly, is configured to transform the ToF camera model data into modelled ToF data, which can be generated based on an updated ToF camera model based on the determined difference.

In other words, the network $T_{R \rightarrow S}$ is a (deep) neural network which is configured to transform the real ToF data into transformed real ToF, which are supposed to follow the same (or a similar) statistical distribution as the modelled ToF data. In some embodiments, the network $T_{R \rightarrow S}$ performs an inverse operation of the network $T_{S \rightarrow R}$.

Furthermore, a discriminative neural network $D_S$ is configured to determine whether the transformed real ToF data follows given statistics of the modelled ToF data.

The networks $T_{S \rightarrow R}$, $T_{R \rightarrow S}$, $D_r$, and $D_s$ are trained simultaneously with an adversarial training scheme as depicted in FIG. 3.

Generally, as can be taken from the description above, the input data for the training process is grouped in two sets: real ToF data and modelled data. The modelled data is generated by ToF simulation data circuitry (as will be discussed below) using known ToF sensor parameters and a simulated scene description, which are provided as a ground truth.

The real ToF data is recorded by a real ToF camera in a real scene. In this case, no ground truth is required. The real scenes may be approximated with the simulated scenes, which is, however, not necessary.

In this embodiment, modelled ToF data $I_s$ is acquired on forty simulated scenes and real ToF data $I_r$ is acquired on a hundred real scenes.

Furthermore, the network $T_{S \rightarrow R}$ can be used to train a ToF depth refinement network, for example (similar to the denoiser G), such that it is possible to (better) generalize from modelled ToF data to real ToF data, such that it is not necessary to provide real ToF data as ground truth, since this might be considered as costly. Thereby, a domain shift issue, which is known and common for neural networks generating modelled data, but are tested on real data, can be reduced.

Figure 4:
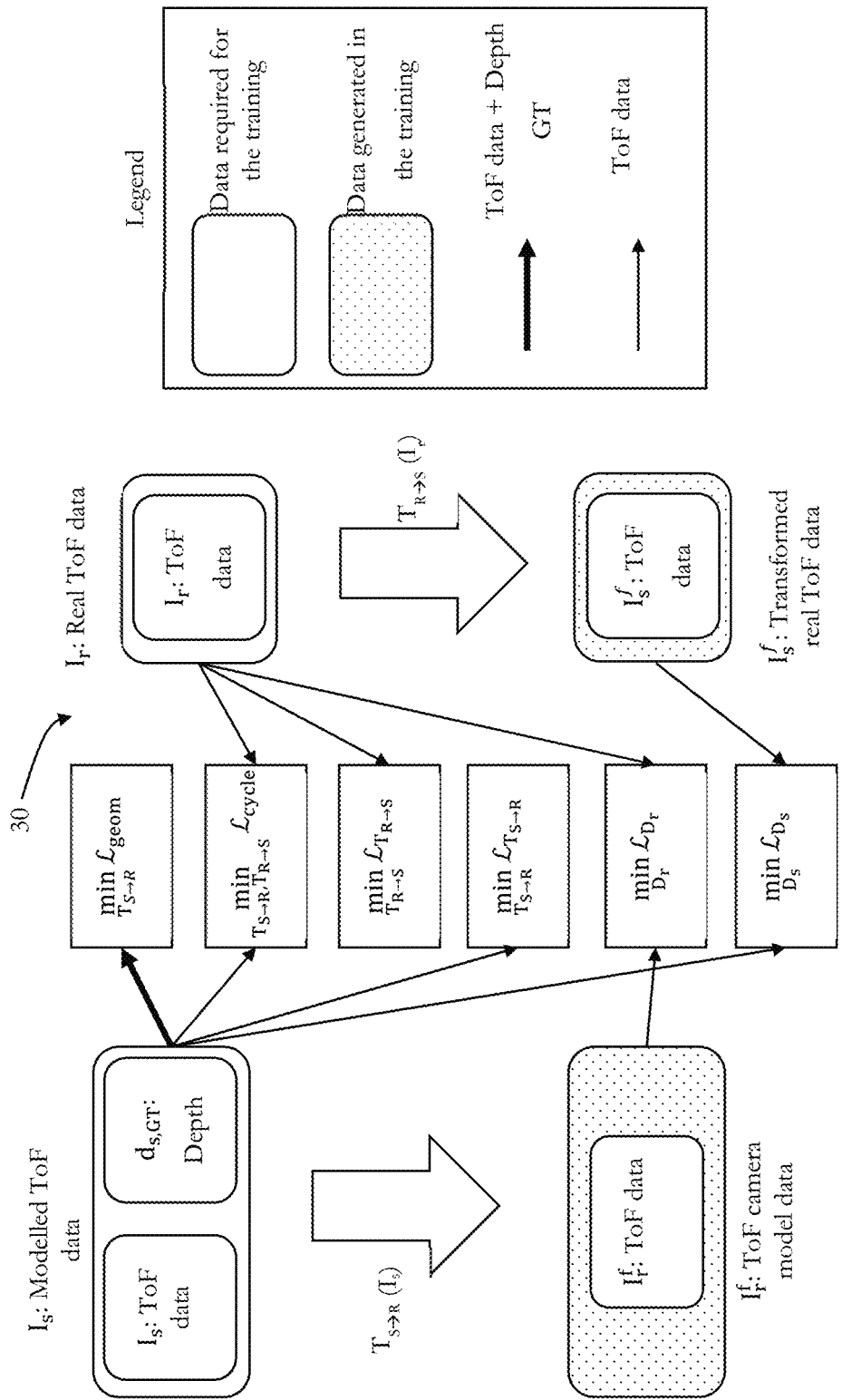
FIG. 4 depicts a diagram of a time-of-flight simulation data training method according to the present disclosure.

FIG. 4 depicts a diagram of a time-of-flight simulation data training method 30 according to the present disclosure.

Modelled ToF data $I_S$ are provided (which further include depth information $d_{s,GT}$). By transforming the modelled ToF data $I_S$ with the convolutional neural network $T_{S \rightarrow R}$, ToF camera model data $I_r^f$ are obtained.

Moreover, real ToF data $I_r$ are obtained, which are transformed into transformed real ToF data with the convolutional neural network $T_{R \rightarrow S}$.

For training, the discriminative neural networks $D_s$ and $D_r$ are defined as follows:

$$D_s(I) = \begin{cases} 1 & \text{if } I \in \mathcal{J}_s \\ 0 & \text{otherwise} \end{cases} ; D_r(I) = \begin{cases} 1 & \text{if } I \in \mathcal{J}_r \\ 0 & \text{otherwise} \end{cases} \quad (1)$$

where $\mathcal{J}_r$ corresponds to the real ToF data and $\mathcal{J}_s$ corresponds to the modelled time-of-flight data. As discussed, there are four networks, $T_{S \rightarrow R}$, $T_{R \rightarrow S}$, $D_r$ and $D_s$, which are trained in an adversarial way. $T_{S \rightarrow R}$ is trained to produce time-of-flight camera model data following statistics of the real time-of-flight data when its input is the modelled time-of-flight data. $D_r$ is trained to recognize real time-of-flight data stemming from $\mathcal{J}_r$ as belonging to the class 1 and time-of-flight camera model data produced by $T_{S \to R}$ as belonging to the class 0. Similarly, $T_{R \to S}$ is trained to produce transformed real time-of-flight data following statistic of the modelled time-of-flight data when its input is real data. $D_s$ is trained to recognize data coming from $\mathcal{I}_s$ as belonging to the class 1 and the data produced by $T_{R \to S}$ as belonging to the class 0. More formally, at each training step the networks are jointly trained by minimizing following loss functions:

$$\min_{D_s} \mathcal{L}_{D_s} = \min_{D_s} E_{I_s \in \mathcal{I}_s; I_s^f \in \mathcal{I}_s^f}[|D_s(I_s) - 1|^2 + |D_s(I_s^f)|^2]; \quad (2)$$

$$\min_{D_r} \mathcal{L}_{D_r} = \min_{D_r} E_{I_r \in \mathcal{I}_r; I_r^f \in \mathcal{I}_r^f}[|D_r(I_r) - 1|^2 + |D_r(I_r^f)|^2]; \quad (3)$$

$$\min_{T_{R \to S}} \mathcal{L}_{T_{R \to S}} = \min_{T_{S \to R}} E_{I_r \in \mathcal{I}_r}[|D_s(T_{R \to S}(I_r)) - 1|^2]; \quad (4)$$

$$\min_{T_{S \to R}} \mathcal{L}_{T_{S \to R}} = \min_{T_{S \to R}} E_{I_s \in \mathcal{I}_s}[|D_r(T_{S \to R}(I_s)) - 1|^2]. \quad (5)$$

Where $\mathcal{I}_s^f$ and $\mathcal{I}_r^f$ are the set of transformed real ToF data and ToF camera model data, respectively generated by $T_{R \to S}$ and $T_{S \to R}$.

For example, the sets $\mathcal{I}_s^f$ and $\mathcal{I}_r^f$ can contain both newly generated "fake" data, i.e. the transformed real ToF data and the ToF camera model data, with the current status of $T_{R \to S}$ and $T_{S \to R}$, and examples created during previous training steps.

During the training process, $T_{S \to R}$ will try to "fool" $D_r$ by producing data with statistics resembling the ones of real data, in contrast $D_r$ will become better at recognizing ToF camera model data from $T_{S \to R}$. In this way, both $T_{R \to S}$ and $D_r$ will improve in their target task. If the training converges, it will reach a saddle point for the loss functions, in which $T_{S \to R}$ is able to produce simulated ToF data, as discussed herein. A similar rationale applies to $T_{R \to S}$ and $D_s$.

In some embodiments, a cycle consistency constraint may be envisaged in such domain translation processes that forces the sequential application of $T_{S \to R}$ and $T_{R \to S}$ to be closer to the identity operation. This might ensure that no artifacts are introduced in the domain translation operation. A cycle consistency is implemented by minimizing the following loss:

$$\min_{T_{S \to R}; T_{R \to S}} \mathcal{L}_{cycle} = \quad (6)$$

$$\min_{T_{S \to R}; T_{R \to S}} E_{I_s \in \mathcal{I}_s; I_r \in \mathcal{I}_r}[|T_{S \to R}(T_{R \to S}(I_r)) - I_r| + |T_{R \to S}(T_{S \to R}(I_s)) - I_s|];$$

By jointly minimizing Equation (2), (3), (4), (5) and (6), it is possible to train $T_{R \to S}$ and $T_{S \to R}$, until they produce data which respectively follow the modelled ToF data and the real ToF data statistics as captured by the domain discriminators $D_s$ and $D_r$. However, this does not necessarily guarantee that the original data and the newly translated data is representative of the same geometric scene. For this reason, one supplementary loss term is added in order to enforce a geometric consistency in the domain translation process. This can be achieved by forcing $T_{S \to R}$ to produce ToF camera model data which have the same depth ground truth of their synthetic counterpart (i.e. the transformed real ToF data). The idea is that $T_{S \to R}$ has to be trained in a way such that the synthetic denoising network G gives as output the depth ground truth corresponding to the modelled ToF data, when the ToF camera model data generated by $T_{S \to R}$ is given as input to G. More formally, an additional loss term to be minimized is introduced, forcing this constraint:

$$\min_{T_{S \to R}} \mathcal{L}_{geom} = \min_{T_{S \to R}} E_{(I_s, d_{s,GT}) \in \mathcal{I}_s}[|G(T_{S \to R}(I_s)) - d_{s,GT}|^2]. \quad (7)$$

The system is trained by minimizing all the six losses (Equation (2), (3), (4), (5), (6) and (7)). They can be opportunely weighted in order to ensure the convergence and stability of the training. FIG. 4 contains the representation of how the data is picked from each dataset to train the system of neural networks.

As can be taken from FIG. 4, the modelled ToF data $I_s$ including a pure data-structure and the depth information $d_{s,GT}$ are transformed into the ToF camera model data $I_r^f$ by the convolutional neural network $T_{S \to R}$.

Furthermore, the modelled ToF data $I_s$ and the depth data $d_{s,GT}$ are taken as an input for the function of equation (7).

The modelled ToF data $I_s$ (without the depth $d_{s,GT}$) is further used as an input to equations (2), (5), and (6).

The ToF camera model data $I_r^f$ are taken as an input for equation (3).

The real ToF data $I_r$ are transformed into the transformed real ToF data $I_s^f$ and are taken as an input for equations (3), (4), and (6).

The transformed real ToF data $I_s^f$ are taken as an input into equation (2).

Figure 5:
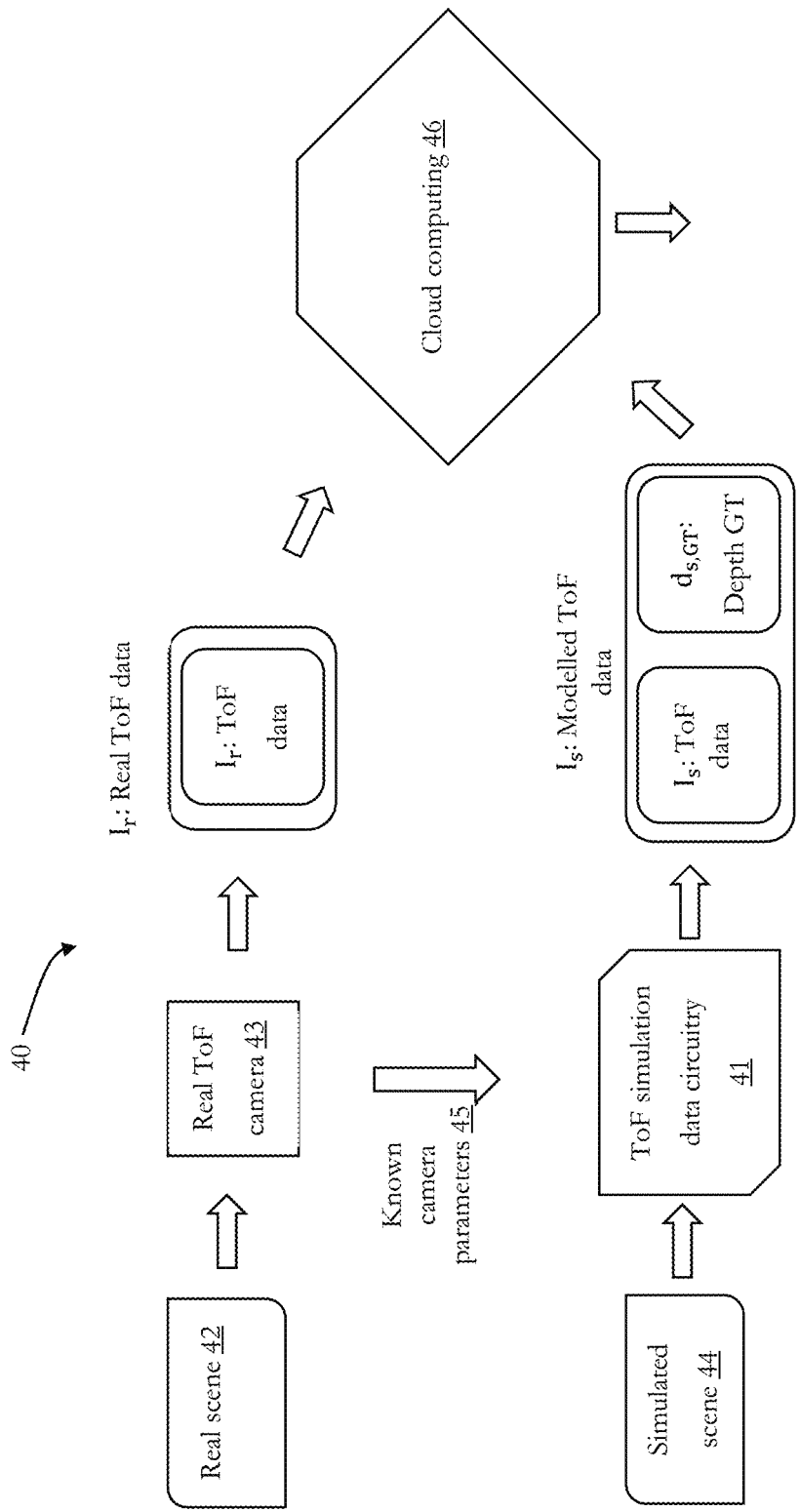
FIG. 5 depicts a diagram of further embodiment of a time-of-flight simulation data training method according to the present disclosure.

FIG. 5 depicts a diagram of a further embodiment of a time-of-flight simulation data training method 40 according to the present disclosure.

The ToF simulation data training method 40 is applied in an online training with real time-of-flight data of multiple real time-of-flight cameras, in this embodiment.

In this embodiment, a gap between ToF camera model data and real ToF data of a new (not known) ToF camera sensor is supposed to be minimized (or closed).

For this new ToF camera sensor, not all noise parameters are known, such that these noise parameters are not taken into account in (known) ToF simulation data circuitry 41.

Noise parameters which are not known in this embodiment are photo response non-uniformity (PRNU), dark signal non-uniformity (DSNU), pixel crosstalk, and lens scattering parameters.

Hence, the ToF simulation data training method 40 is utilized to learn and add the noise parameters to the ToF simulation data circuitry 41.

Furthermore, the method 40 is used for capturing noise statistics of newly introduced features on the ToF sensor, which are in this embodiment a new pixel architecture, polarization properties, and multi-spectral information.

Generally, such a method, and accordingly, the present disclosure is not limited to be used for ToF sensors since the training concept may, with corresponding modifications of the input and output of simulation data circuitry and/or training circuitry, be applied to other image sensors, as well, such as a dynamic vision sensor (DVS), an RGB sensor, or the like.

Furthermore, the ToF simulation data training method 40 (as well as any other training method described herein) can be used to capture a difference of material properties between real ToF data and ToF camera model data, in case of using a multi-frequency ToF camera, which is used in this embodiment.

For example, different materials may lead to different multipath effects, such that ToF camera model data can represent different materials by simulating different multipath influences for the different materials. For example, known algorithms for providing modelled ToF data only represent Lambertian surfaces since real material reflection properties may be considered as complex (especially for rendering).

In the ToF simulation data training method 40, a real scene 42 is captured by a real ToF camera 43. A simulated scene 44 is simulated with the ToF simulation data circuitry, which takes known camera parameters 45 of the real ToF camera 43 into account.

The real ToF camera 43 provides real ToF data $I_r$, and the ToF simulation data circuitry 41 provides modelled ToF data $I_s$, as well as depth data $d_{s,GT}$, as described above.

Both datasets are used for cloud computing 46, such that large datasets of real ToF data $I_r$ of multiple real ToF cameras 43 can be handled, and a ToF simulation data training method 20, as described in FIG. 2 can be applied in order to update the ToF simulation data circuitry 41.

In such an online training, a simulator customer can set the known parameters of the new camera in the ToF simulation data circuitry. With this, the customer can create modelled ToF data for the training described herein. The simulated scenes used by the ToF simulation data circuitry 41 can be provided by the simulator vendor or created by the simulator customer, for example.

In another case, the customer can focus on a specific context in which the performance of the model based simulator, e.g. short range scenes, long range scenes, table top scenes, should be improved.

Furthermore, the customer can use the real ToF camera 43 to record the real ToF data $I_r$ with the new sensor in the context in which the performance of the model based simulator should be improved, for example in scenes containing a certain material or scenes with a certain scale. These recordings can be collected without recording any labeled data, for example. In such a case, the real data collection may be simpler and cheaper compared to data required by data driven systems requiring real data labeling with expensive depth ground truth acquisition.

Once the modelled ToF data $I_s$ and the real ToF data $I_r$ are obtained, they can be used for the training. Alternatively to the training in the cloud 46, the training can be performed on the customer's hardware (e.g. local PC).

After the training, the convolutional neural network $T_{S \rightarrow R}$ can be applied to the output of the ToF simulation data circuitry 41 in order to minimize (close) the gap between the modelled ToF data $I_s$ and the real ToF data $I_r$.

Figure 6:
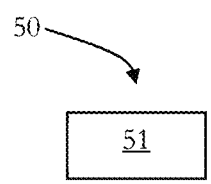
FIG. 6 depicts an embodiment of a time-of-flight simulation data output method according to the present disclosure in a block diagram.

FIG. 6 depicts an embodiment of a time-of-flight simulation data output method 50 according to the present disclosure in a block diagram.

At 51, modelled ToF camera data is input into a ToF simulation neural network, as discussed herein.

Figure 7:
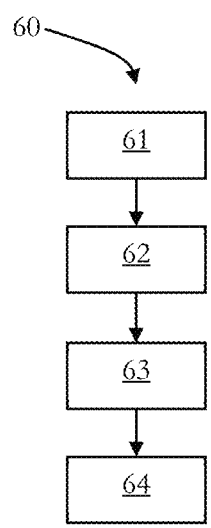
FIG. 7 depicts a further embodiment of a time-of-flight simulation data output method according to the present disclosure in a block diagram.

FIG. 7 depicts a further embodiment of a time-of-flight simulation data output method 60 according to the present disclosure in a block diagram.

At 61, modelled ToF camera data is obtained from ToF model-based simulation circuitry, as discussed herein.

At 62, the modelled ToF camera data is input into a ToF simulation neural network, as discussed herein.

At 63, the modelled ToF camera data is transformed into simulated ToF data, as discussed herein.

At 64, the simulated ToF data is output, as discussed herein.

Figure 8:
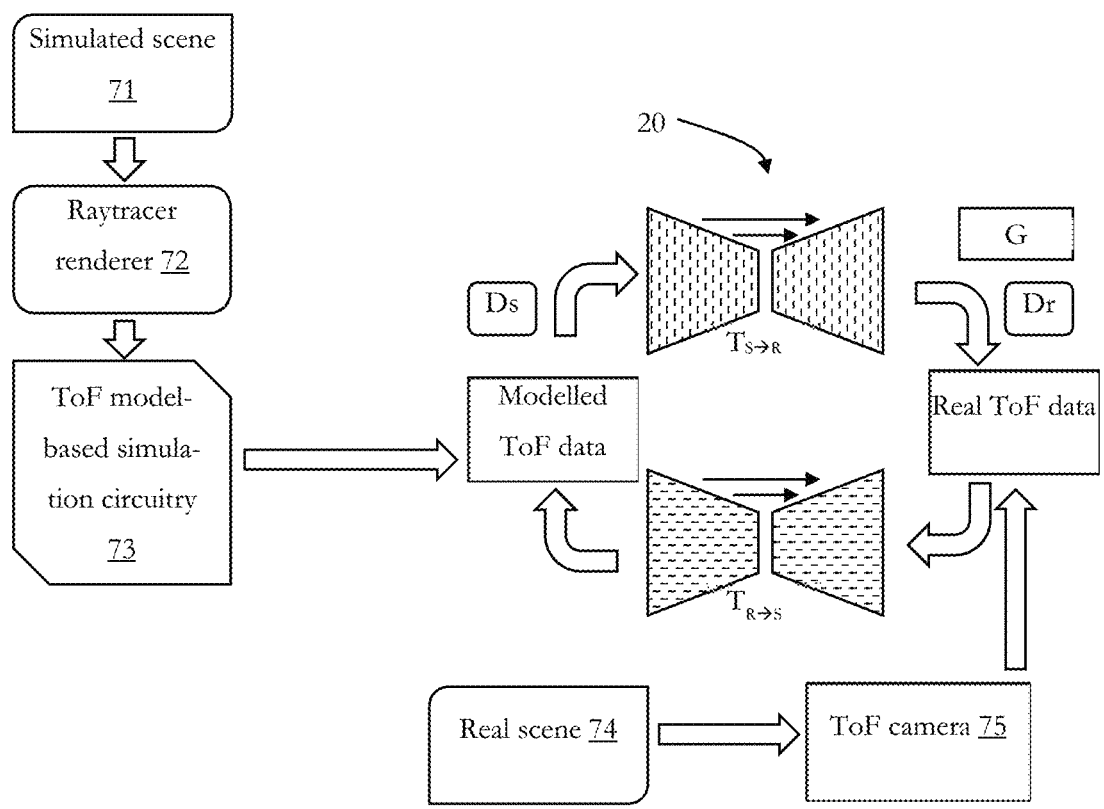
FIG. 8 depicts a diagram for improving ToF model-based simulation circuitry for obtaining ToF simulation data according to the present disclosure.

FIG. 8 depicts a diagram 70 for improving ToF model-based simulation circuitry for obtaining ToF simulation data according to the present disclosure. A simulated scene 71 is fed to a raytracer renderer 72, which is used to simulate light propagation in the simulated scene.

The output of the raytracer renderer 72 is fed to a ToF model-based simulation circuitry 73 which is configured to apply a mathematical model to the output of the raytracer renderer 72 in order to generate modelled ToF data.

The modelled ToF data are fed to the ToF simulation data training circuitry 20, as discussed above. Furthermore, in FIG. 8, it is depicted that a real scene 74 is shot with a camera 75. In turn real ToF data are generated which are fed to the ToF simulation data training circuitry 20. Based on the training in the ToF simulation data training circuitry 20, the output of the ToF model-based simulation circuitry is improved. Hence, as can be taken from this embodiment, the ToF model-based simulation circuitry 73 together with the ToF simulation data training circuitry constitutes, in some embodiments, ToF simulation data circuitry according to the present disclosure It should be recognized that the embodiments describe methods with an exemplary ordering of method steps. The specific ordering of method steps is however given for illustrative purposes only and should not be construed as binding. For example, the ordering of 2 and 3 in the embodiment of FIG. 1 may be exchanged. Also, the ordering of 11 and 12 in the embodiment of FIG. 2 may be exchanged. Other changes of the ordering of method steps may be apparent to the skilled person.

Please note that the division of the ToF simulation data training circuitry 20 into the different neural networks is only made for illustration purposes and that the present disclosure is not limited to any specific division of functions in specific units. For instance, the circuitry 20 could be implemented by a respective programmed processor, field programmable gate array (FPGA) and the like.

In some embodiments, also a non-transitory computer-readable recording medium is provided that stores therein a computer program product, which, when executed by a processor, such as the processor described above, causes the methods described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Time-of-flight simulation data training circuitry, configured to:
  obtain time-of-flight camera model data based on a time-of-flight camera model modelling a real time-of-flight camera of a real time-of-flight camera type;
  obtain real time-of-flight data from at least one real time-of-flight camera of the real time-of-flight camera type;
  determine a difference between the real time-of-flight data and the time-of-flight camera model data; and update, based on the determined difference, the time-of-flight camera model for generating simulated time-of-flight data representing the real time-of-flight camera.

(2) The time-of-flight simulation data training circuitry of (1), wherein the time-of-flight camera model data is obtained from a time-of-flight camera model neural network.

(3) The time-of-flight simulation data training circuitry of (2), wherein the time-of-flight camera model neural network is a convolutional neural network.

(4) The time-of-flight simulation data training circuitry of anyone of (1) to (3), wherein the difference between the real time-of-flight data and the time-of-flight camera model data is determined in a discriminative neural network.

(5) The time-of-flight simulation data training circuitry of anyone of (1) to (4), further configured to:
obtain modelled time-of-flight camera data.

(6) The time-of-flight simulation data training circuitry of (5), further configured to:
transform the modelled time-of-flight camera data into the time-of-flight camera model data.

(7) The time-of-flight simulation data training circuitry of (6), wherein the transforming is carried out with a time-of-flight camera model neural network.

(8) The time-of-flight simulation data training circuitry of anyone of (5) to (7), wherein the modelled time-of-flight camera data is obtained from time-of-flight model-based simulation circuitry.

(9) The time-of-flight simulation data training circuitry of anyone of (1) to (8), wherein the real time-of-flight data is obtained from a plurality of time-of-flight cameras of the real time-of-flight camera type for determining a statistical difference of the real time-of-flight camera type and the time-of-flight camera model.

(10) A time-of-flight simulation data training method, comprising:
obtaining time-of-flight camera model data based on a time-of-flight camera model modelling a real time-of-flight camera of a real time-of-flight camera type;
obtaining real time-of-flight data of at least one real time-of-flight camera of the real time-of-flight camera type;
determining a difference between the real time-of-flight data and the time-of-flight camera model data; and
updating, based on the determined difference, the time-of-flight camera model for generating simulated time-of-flight data representing the real time-of-flight camera.

(11) The time-of-flight simulation data training method of (10), wherein the time-of-flight camera model data is obtained from a time-of-flight camera model neural network.

(12) The time-of-flight simulation data training method of (11), wherein the time-of-flight camera model neural network is a convolutional neural network.

(13) The time-of-flight simulation data training method of anyone of (10) to (12), wherein the difference between the real time-of-flight data and the time-of-flight camera model data is determined in a discriminative neural network.

(14) The time-of-flight simulation data training method of anyone of (10) to (13), further comprising:
obtaining modelled time-of-flight camera data.

(15) The time-of-flight simulation data training method of (14), further comprising:
transforming the modelled time-of-flight camera data into the time-of-flight camera model data.

(16) The time-of-flight simulation data training method of (15), wherein the transforming is carried out with a time-of-flight camera model neural network.

(17) The time-of-flight simulation data training method of anyone of (14) to (16), wherein the modelled time-of-flight camera data is obtained from time-of-flight model-based simulation circuitry.

(18) The time-of-flight simulation data training method of anyone of (10) to (17), wherein the real time-of-flight data is obtained from a plurality of time-of-flight cameras of the real time-of-flight camera type for determining a statistical difference of the real time-of-flight camera type and the time-of-flight camera model.

(19) A computer program comprising program code causing a computer to perform the method according to anyone of (10) to (18), when being carried out on a computer.

(20) A non-transitory computer-readable recording medium that stores therein a computer program product, which, when executed by a processor, causes the method according to anyone of (10) to (18) to be performed.

(21) A time-of-flight simulation data output method, comprising:
inputting modelled time-of-flight camera data into a time-of-flight simulation neural network configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type.

(22) The time-of-flight simulation data output method of (21), wherein the time-of-flight simulation neural network is a convolutional neural network.

(23) The time-of-flight simulation data output method of (21) or (22), further comprising:
obtaining the modelled time-of-flight camera data from time-of-flight model-based simulation circuitry.

(24) The time-of-flight simulation data output method of (23), further comprising:
transforming the modelled time-of-flight camera data into the simulated time-of-flight data; and
outputting the simulated time-of-flight data.

(25) A computer program comprising program code causing a computer to perform the method according to anyone of (21) to (24), when being carried out on a computer.

(26) A non-transitory computer-readable recording medium that stores therein a computer program product, which, when executed by a processor, causes the method according to anyone of (21) to (24) to be performed.

(27) Time-of-flight simulation data circuitry configured to:
provide a time-of-flight simulation neural network, configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type.

(28) The time-of-flight simulation data circuitry of (27), wherein the time-of-flight camera model is based on a time-of-flight camera model neural network.

(29) The time-of-flight simulation data circuitry of (28), wherein the time-of-flight camera model neural network is a convolutional neural network.

(30) The time-of-flight simulation data circuitry of anyone of (27) to (29), further configured to:
obtain the modelled time-of-flight camera data from a time-of-flight modelling neural network.

(31) The time-of-flight simulation data circuitry of (30), further configured to:
transform the modelled time-of-flight camera data into the simulated time-of-flight data; and output the simulated time-of-flight data.

The invention claimed is:

1. Time-of-flight simulation data training circuitry, configured to:
obtain time-of-flight camera model data based on a time-of-flight camera model modelling a real time-of-flight camera of a real time-of-flight camera type, wherein the time-of-flight camera model data originate from a ground truth depth of simulated scenes which are given as ground truth to a pretrained denoiser;
obtain real time-of-flight data from at least one real time-of-flight camera of the real time-of-flight camera type;
determine a difference between the real time-of-flight data and the time-of-flight camera model data; and
update, based on the determined difference, the time-of-flight camera model for generating simulated time-of-flight data representing the real time-of-flight camera.

2. The time-of-flight simulation data training circuitry of claim 1, wherein the time-of-flight camera model data is obtained from a time-of-flight camera model neural network.

3. The time-of-flight simulation data training circuitry of claim 2, wherein the time-of-flight camera model neural network is a convolutional neural network.

4. The time-of-flight simulation data training circuitry of claim 1, wherein the difference between the real time-of-flight data and the time-of-flight camera model data is determined in a discriminative neural network.

5. The time-of-flight simulation data training circuitry of claim 1, further configured to:
obtain modelled time-of-flight camera data.

6. The time-of-flight simulation data training circuitry of claim 5, further configured to:
transform the modelled time-of-flight camera data into the time-of-flight camera model data.

7. The time-of-flight simulation data training circuitry of claim 6, wherein the transforming is carried out with a time-of-flight camera model neural network.

8. The time-of-flight simulation data training circuitry of claim 5, wherein the modelled time-of-flight camera data is obtained from time-of-flight model-based simulation circuitry.

9. The time-of-flight simulation data training circuitry of claim 1, wherein the real time-of-flight data is obtained from a plurality of time-of-flight cameras of the real time-of-flight camera type for determining a statistical difference of the real time-of-flight camera type and the time-of-flight camera model.

10. A time-of-flight simulation data training method, comprising:
obtaining time-of-flight camera model data based on a time-of-flight camera model modelling a real time-of-flight camera of a real time-of-flight camera type, wherein the time-of-flight camera model data originate from a ground truth depth of simulated scenes which are given as ground truth to a pretrained denoiser;
obtaining real time-of-flight data of at least one real time-of-flight camera of the real time-of-flight camera type;
determining a difference between the real time-of-flight data and the time-of-flight camera model data; and
updating, based on the determined difference, the time-of-flight camera model for generating simulated time-of-flight data representing the real time-of-flight camera.

11. The time-of-flight simulation data training method of claim 10, wherein the time-of-flight camera model data is obtained from a time-of-flight camera model neural network.

12. The time-of-flight simulation data training method of claim 11, wherein the time-of-flight camera model neural network is a convolutional neural network.

13. The time-of-flight simulation data training method of claim 10, wherein the difference between the real time-of-flight data and the time-of-flight camera model data is determined in a discriminative neural network.

14. The time-of-flight simulation data training method of claim 13, wherein the modelled time-of-flight camera data is obtained from time-of-flight model-based simulation circuitry.

15. The time-of-flight simulation data training method of claim 10, further comprising:
obtaining modelled time-of-flight camera data.

16. The time-of-flight simulation data training method of claim 15, further comprising:
transforming the modelled time-of-flight camera data into the time-of-flight camera model data.

17. The time-of-flight simulation data training method of claim 16, wherein the transforming is carried out with a time-of-flight camera model neural network.

18. The time-of-flight simulation data training method of claim 10, wherein the real time-of-flight data is obtained from a plurality of time-of-flight cameras of the real time-of-flight camera type for determining a statistical difference of the real time-of-flight camera type and the time-of-flight camera model.

19. A time-of-flight simulation data output method, comprising:
inputting modelled time-of-flight camera data into a time-of-flight simulation neural network configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type,
wherein the time-of-flight camera model data originate from a ground truth depth of simulated scenes which are given as ground truth to a pretrained denoiser.

20. The time-of-flight simulation data output method of claim 19, wherein the time-of-flight simulation neural network is a convolutional neural network.

21. The time-of-flight simulation data output method of claim 19, further comprising:
obtaining the modelled time-of-flight camera data from time-of-flight model-based simulation circuitry.

22. The time-of-flight simulation data output method of claim 21, further comprising:
transforming the modelled time-of-flight camera data into the simulated time-of-flight data; and
outputting the simulated time-of-flight data.

23. Time-of-flight simulation data circuitry configured to:
provide a time-of-flight simulation neural network, configured to output simulated time-of-flight data representing a real time-of-flight camera of a real time-of-flight camera type, wherein the time-of-flight simulation neural network is trained to generate the simulated time-of-flight data based on a trained difference between time-of-flight camera model data being obtained based on a time-of-flight camera model, modelling the real time-of-flight camera, and real time-of-flight data obtained from at least one real time-of-flight camera of the real time-of-flight camera type,
wherein the time-of-flight camera model data originate from a ground truth depth of simulated scenes which are given as ground truth to a pretrained denoiser.

24. The time-of-flight simulation data circuitry of claim 23, wherein the time-of-flight camera model is based on a time-of-flight camera model neural network.

25. The time-of-flight simulation data circuitry of claim 24, wherein the time-of-flight camera model neural network is a convolutional neural network.

26. The time-of-flight simulation data circuitry of claim 23, further configured to:
obtain the modelled time-of-flight camera data from time-of-flight model-based simulation circuitry.

27. The time-of-flight simulation data circuitry of claim 26, further configured to:
transform the modelled time-of-flight camera data into the simulated time-of-flight data; and
output the simulated time-of-flight data.

* * * * *